United States Patent
Spencer et al.

(10) Patent No.: US 10,422,399 B2
(45) Date of Patent: Sep. 24, 2019

(54) ACTIVE SYSTEM FOR DAMPING MOTION OF A STEERING WHEEL

(71) Applicant: Key Safety Systems, Inc., Sterling Heights, MI (US)

(72) Inventors: Byron Spencer, Bloomfield Hills, MI (US); Michael Jendrowski, Washington Township, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 63 days.

(21) Appl. No.: 15/560,512

(22) PCT Filed: Mar. 23, 2016

(86) PCT No.: PCT/US2016/023739
§ 371 (c)(1),
(2) Date: Sep. 22, 2017

(87) PCT Pub. No.: WO2016/154285
PCT Pub. Date: Sep. 29, 2016

(65) Prior Publication Data
US 2018/0112734 A1 Apr. 26, 2018

Related U.S. Application Data

(60) Provisional application No. 62/137,185, filed on Mar. 23, 2015.

(51) Int. Cl.
*B62D 7/22* (2006.01)
*F16F 7/10* (2006.01)
*B62D 1/04* (2006.01)

(52) U.S. Cl.
CPC ............ *F16F 7/1011* (2013.01); *B62D 1/046* (2013.01); *B62D 7/222* (2013.01)

(58) Field of Classification Search
CPC ....... B62D 7/222; B62D 1/046; F16F 7/1011; F16F 15/03
USPC .............................................. 280/771; 74/552
See application file for complete search history.

(56) References Cited

U.S. PATENT DOCUMENTS

| 8,632,097 B1 | 1/2014 | Quinn |
| 2011/0272229 A1* | 11/2011 | Kobayashi ............. F16F 7/1011 188/379 |

FOREIGN PATENT DOCUMENTS

| DE | 102008030757 A1 | 1/2010 |
| DE | 102011011823 A1 | 9/2012 |
| EP | 1162124 A2 | 12/2001 |

* cited by examiner

*Primary Examiner* — Keith J Frisby
(74) *Attorney, Agent, or Firm* — David L. King; Markell Seitzman

(57) ABSTRACT

A system 300 for controlling vibratory motion in a vehicle steering wheel 20 prone to oscillate in a given direction due to extraneous inputs at one or more frequencies. The system 300 has a steering wheel 20 of the type exhibiting a vibratory motion along a defined axis at one or more frequencies, at least one sensor for sensing the acceleration of the steering wheel 20 along the defined axis and an active control mechanism responsive to the output of the at least one sensor. The sensor is an accelerometer having a movable first mass 70 and a solenoid coil 56 which when activated moves the mass 70 in a direction opposite to the motion of the steering wheel 20 and at the frequency of motion of the steering wheel 20.

17 Claims, 4 Drawing Sheets

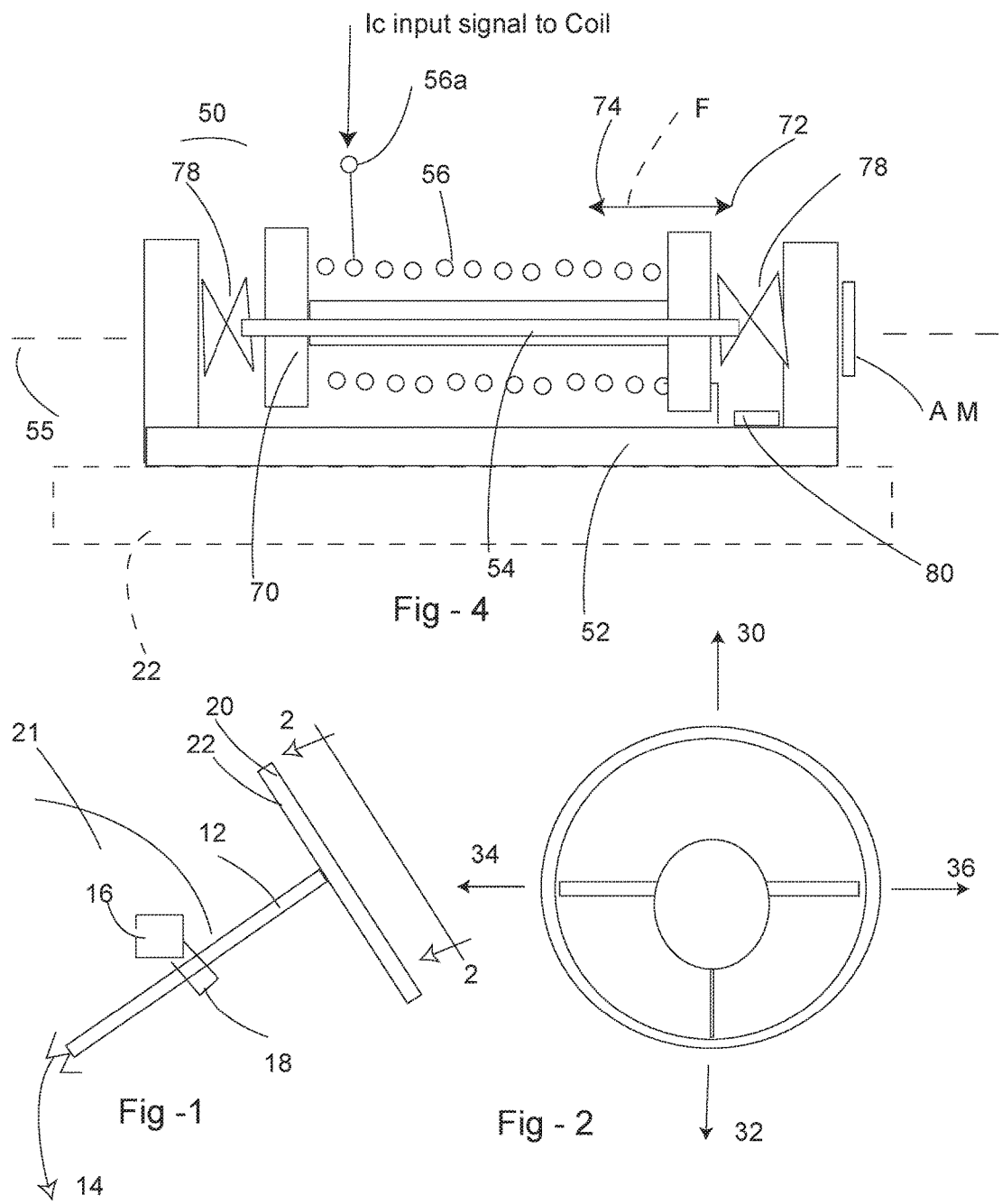

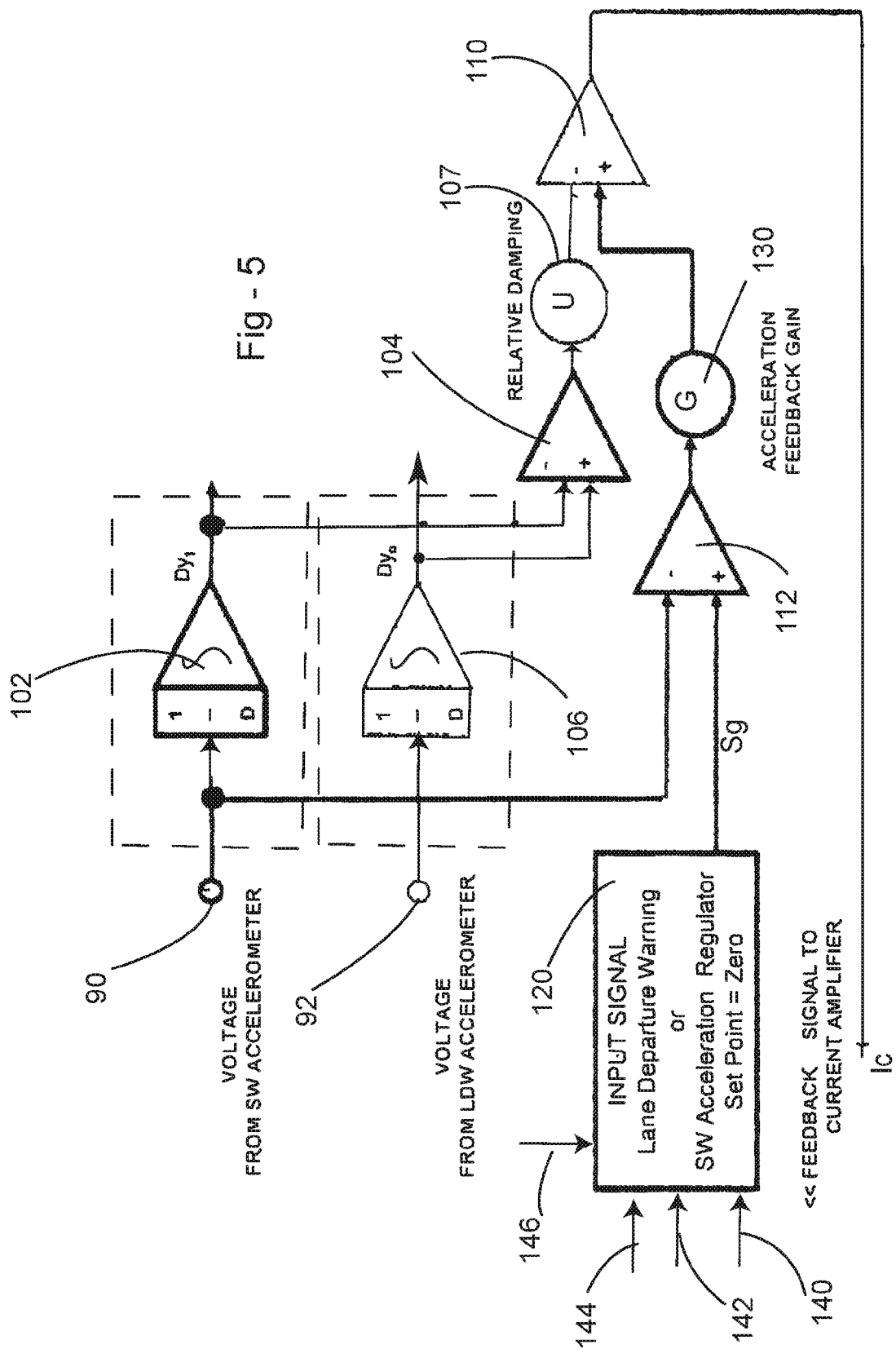

ACTIVE SYSTEM FOR DAMPING MOTION OF A STEERING WHEEL

BACKGROUND OF THE INVENTION

The present invention generally relates to a means of actively damping the vibration of an automotive steering wheel and in addition to a method of providing a tactile, warning feedback signal to the driver.

Reference is briefly made to FIGS. 1 and 2 which diagrammatically illustrate a steering wheel secured to the steering column. In FIG. 1 the steering wheel 20 is secured to a steering column 12 which in turn is operatively connected to the steering system as illustrated by arrow 14. Quite often the steering column is secured to a crossbeam 16 in the vehicle by various fastening mechanisms generally shown as 18. An exemplary dashboard or instrument panel 21 is also illustrated covering this connection. FIG. 2 is a plan view of steering wheel 20 taken along lines 2-2 of FIG. 1 and shows the primary directions or modes of steering wheel vibration which are primarily vertical shown by arrows 30 and 32 and to a lesser degree horizontal shown by arrows 34 and 36.

If not compensated for, the vibration of the vehicle steering wheel is a source of discomfort and annoyance to the driver. The prior art shows steering wheel vibration can be reduced by adding a passive damper. This invention provides for an "active" steering wheel damper that reduces vibrations of a steering wheel over the full range of frequencies that may be induced by various vehicle and engine operating speeds. The present invention is an enhancement to the widely employed passive steering wheel dampers that are effective only at a single predetermined vibrational frequency.

As mentioned, mechanically induced steering wheel vibration is a source of annoyance to the driver. However, if the steering wheel can be controllably forced to vibrate, such vibration can be used to warn a driver of an impending danger.

SUMMARY OF THE INVENTION

A system for controlling vibratory motion in a vehicle steering wheel prone to oscillate in a given direction due to extraneous inputs at one or more frequencies. The system has a steering wheel of the type exhibiting a vibratory motion along a defined axis at one or more frequencies, at least one sensor for sensing the acceleration of the steering wheel along the defined axis and an active control mechanism responsive to the output of the at least one sensor. The sensor is an accelerometer having a movable first mass and a solenoid coil which when activated moves the mass in a direction opposite to the motion of the steering wheel and at the frequency of motion of the steering wheel.

The invention comprises at least one sensor having at least one, preferably a plurality of accelerometers, at least one motor and at least one mass driven by the motor working together in a vehicle steering wheel to drive roadway or other induced vibrations to zero.

The present invention includes a linear motor or vibrator that powers a mass and causes it to accelerate along the predetermined axis utilizing a closed loop feedback controller and, by measuring the acceleration of the steering wheel as well as the acceleration of the movable mass, steering wheel vibration is reduced or damped across a range of frequencies. The goal is to actively drive steering wheel vibrations to as close to zero as possible. In addition to damping steering wheel vibrations the present invention includes an alternate mode of operation which is to introduce at selected times a steering wheel vibration the driver can feel and interpret as a warning of an impending danger.

The system includes a second sensor capable of identifying a pending emergency and for generating a pending emergency signal and wherein the control mechanism uses the pending emergency signal to activate the coil thereby inducing a vibration in the steering wheel of sufficient magnitude to be sensed by the driver. For example, if the driven vehicle is equipped with a forward or rearward looking radar or camera, then if the driven vehicle is too close to another vehicle the controller of the present invention can cause the steering wheel to vibrate.

Alternatively if this driven vehicle includes a sideways looking sensor that can detect a vehicle in an adjacent lane. This vehicle with a lane departure sensor or system in combination with the present invention can be used to inform the driver that changing lanes at this time is unsafe.

A system for controlling vibratory motion in a vehicle steering wheel prone to oscillate in a given direction due to extraneous inputs at one or more frequencies. The system has a steering wheel of the type exhibiting a vibratory motion along a defined axis at one or more frequencies, at least one sensor for sensing the acceleration of the steering wheel along the defined axis, an active control mechanism responsive to the output of the at least one sensor. The at least one sensor is an accelerometer and the active control mechanism has a movable first mass and a solenoid coil which when activated moves the mass in a direction opposite to the motion of the steering wheel and at the frequency of motion of the steering wheel. The system would also include a second accelerometer secured to the movable first mass and would include a sensor capable of identifying a car in an adjacent lane and for energizing the solenoid causing the steering wheel to vibrate to notify the driver of the vehicle of an impending emergency.

BRIEF DESCRIPTION OF THE DRAWINGS

FIG. 1 diagrammatically illustrates the steering wheel secured to a steering shaft.

FIG. 2 illustrates steering wheel modes of vibration.

FIG. 4 illustrates an active damper for a steering wheel.

FIG. 5 illustrates a control system for use with a steering wheel and linear motor or vibrator.

DETAILED DESCRIPTION OF THE DRAWINGS

Figure 3:
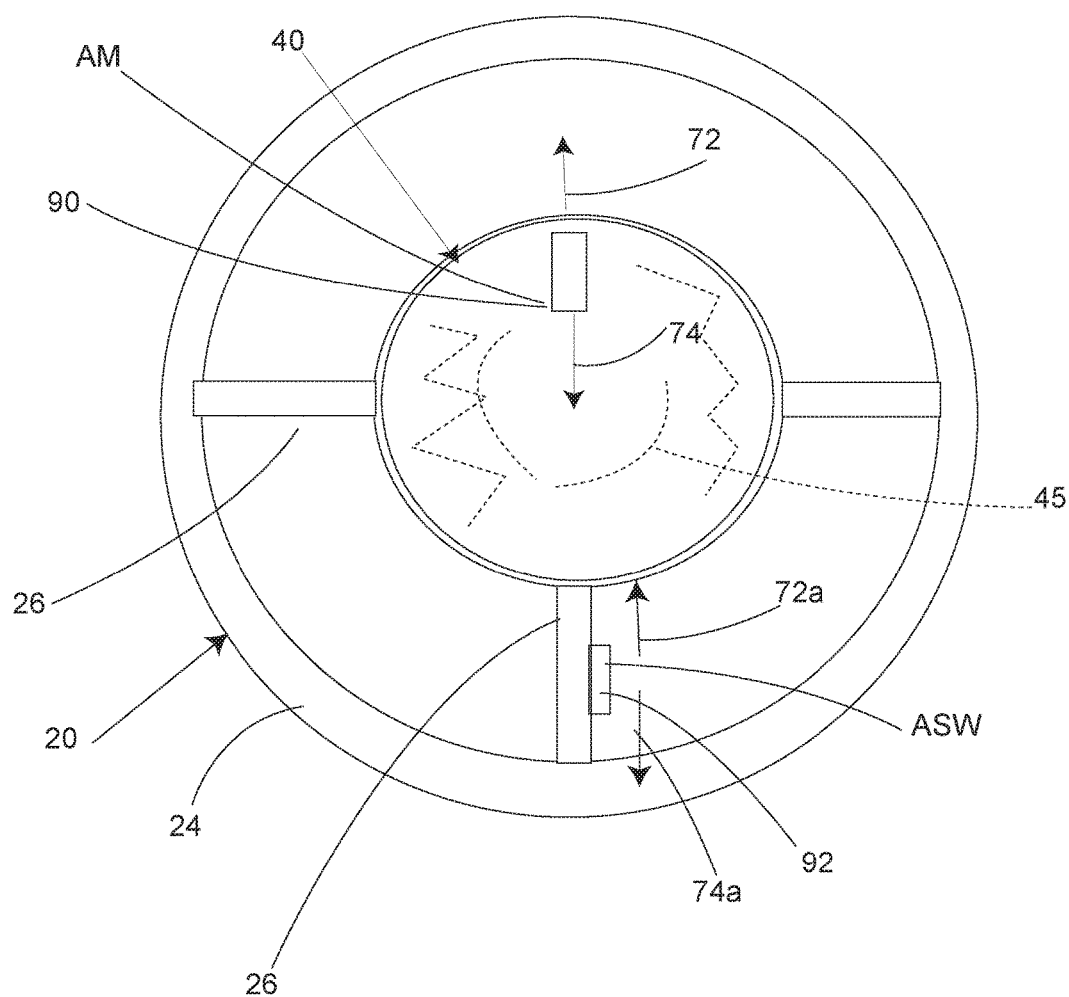
FIG. 3 schematically illustrates an actively damped steering wheel.
Figure 3A:
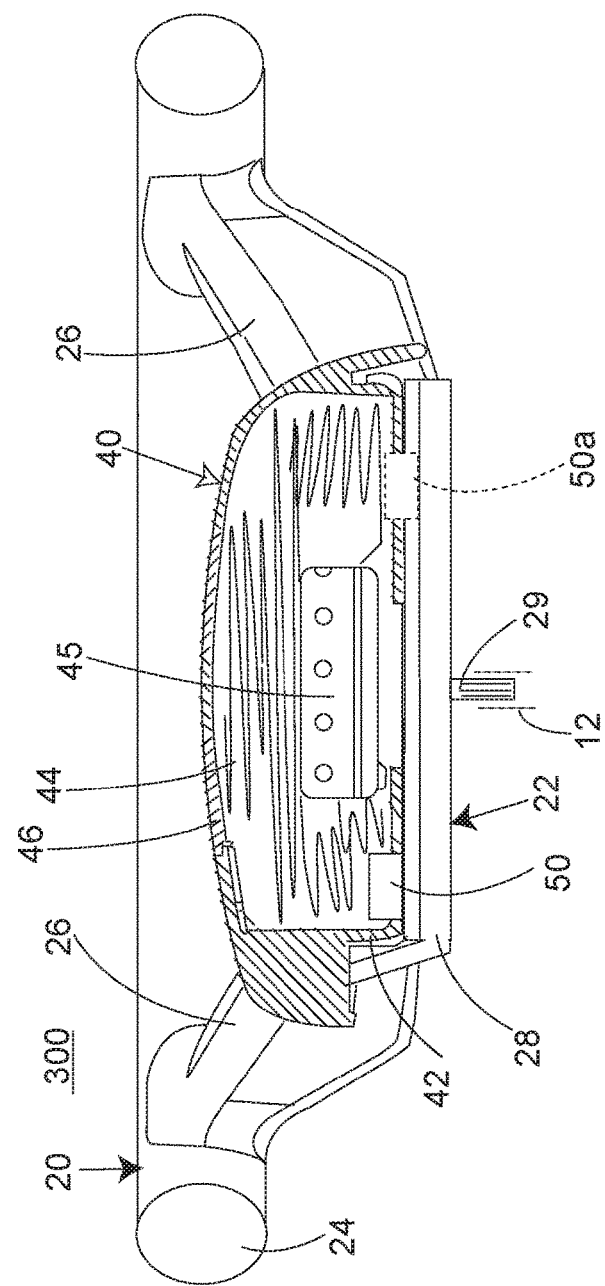
FIG. 3A shows a sectional view of the steering wheel of FIG. 3.

Reference is made to FIGS. 3, 3A and 4 which illustrate some of the major components of an actively controlled steering wheel system 300. System 300 includes steering wheel 20. Steering wheel 20 comprises the general structure of a conventional steering wheel such as a metal armature 22 which includes rim 24 and a number of spokes 26, a central hub plate 28 and/or hub 29 adapted to be secured to the steering column 12. The rim and spokes can be covered by leather or plastic as needed. Steering wheel 20 includes a driver airbag module 40 having a housing 42 secured to the armature 22. Driver airbag module 40 further includes an airbag 44, inflator 45, covered by a cover 46 connected to a housing 42 and secured in a known manner to the armature 22.

FIG. 4 shows an exemplary linear motor or vibrator 50 which is part of system 300. The motor or vibrator includes a housing or bracket 52 connectable to the armature 22 of the steering wheel or alternatively secured to the module housing which in turn is secured to the armature 22. The linear motor 50 includes a core 54 which also defines an axis 55 about which a coil 56 is wound. A mass 70 made of iron or other magnetizable material is positioned adjacent coil 56. The coil is wound such that when excited it will produce an electromagnetic field producing alternating forces in the direction shown in arrows 72 and 74, as also shown in FIG. 3, along or parallel to axis 55. In response to the magnetic field the mass 70 will alternately be linearly displaced in the direction shown by these arrows. The linear motor may include springs 78 mounted between the mass and the housing. As can be appreciated when the coil is excited and the mass moves a reactive force F is transmitted through housing 52 to the armature 22 which is shown diagrammatically in FIG. 4. FIG. 3A shows the linear motor 50 secured to the housing of the driver airbag module and in phantom line shows a motor 50a secured directly to the armature 22.

The linear motor includes a first accelerometer $A_M$ responsive to acceleration along axis 55. The linear motor may include conditioning electronics such as a circuit board generally shown as 80.

Reference is again made to FIG. 3 which shows the linear motor 50 with its accelerometer $A_M$ which is also referred to as 90. FIG. 3 also shows a second accelerometer $A_{SW}$ which is also referred to by numeral 92. In FIG. 3 this second accelerometer is diagrammatically shown secured to one of the spokes 26 of the armature but can be secured to any portion of the steering wheel. As can also be seen in FIG. 3 the sensitive axis 72a-74a of accelerometer 92 is also aligned to the central axis 72-74 of accelerometer 90. As the steering wheel vibrates, this vibration will be sensed by both the accelerometer 92 associated with the armature/steering wheel as well as the accelerometer 90 associated with motor 50.

FIG. 5 illustrates a control system capable of actively damping the vibrations of steering wheel 20. As shown the system is set to damp generally vertical vibrations. A similar setup can be used to damp horizontal or even rotational vibrations. The output of the steering wheel accelerometer 90 is the input to a first integrator 102, the output of which is in essence a scaled signal Dy1 indicative of the velocity of the steering wheel, D is a scaling constant. This signal is input to the negative terminal of an operation amplifier 104. Similarly the output of the motor accelerometer 92 is input into a second integrator 106, the output of which Dy0 is indicative of a scaled velocity with D as a scaling constant. This output signal is input to Op Amp 104 which is scaled in scaling block or circuit 107, U is a scaling constant for the signal. The output of scaling circuit 107 is in essence the scaled differential velocity or damping. The output of the scaling block or circuit 107 is received by a second Op Amp 110. This output or differential velocity signal Ic which can be considered a current demand signal which is transmitted to one of the terminals 56a of coil 56. Upon receiving this signal Ic the coil 56 will vibrate in a manner to drive the difference in the velocities between the steering wheel 20 and the motor 50 to as close to zero as possible, creating a damped solution in which the linear motor damps the vibration of the steering wheel.

As mentioned above the present invention can be utilized as a warning signal to the driver. This is accomplished by adding a third operational amplifier 112 to the system shown in FIG. 5. The steering wheel acceleration as sensed by accelerometer 90 is fed to one terminal of this amplifier 112 while the output Sg of a signal generator 120 is received by the other input of this amplifier 112. The output of amplifier 112 can be scaled in a scaling circuit 130 having a scale factor G is connected to the other input of operational amplifier 110. Signal generator 120 includes for example as an input signal: a) the output signal of a forward facing camera 140 or b) the output signal of a rear facing camera 142 as well as a c) the output of a right hand 144 and left hand 146 lane departure sensor or system. It should be appreciated these signals are just representative of the type of potentially dangerous situation of which the driver should be warned of. Upon receipt of any of any one of these signals the signal generator 120 will generate an oscillatory signal of sufficiently high amplitude to cause the steering wheel to vibrate, thereby warning the driver of impending danger. When such danger has been withdrawn the signal Sg is removed Many changes and modifications in the above-described embodiment of the invention can, of course, be carried out without departing from the scope thereof. Accordingly, that scope is intended to be limited only by the scope of the appended claims.

What is claimed is:

1. A system for controlling induced vibratory motion along a defined axis at one or more frequencies in a vehicle steering wheel (20), the system comprising:
   a steering wheel (20) of the type exhibiting such vibratory motion;
   at least one sensor (90) for sensing the vibratory motion of the steering wheel (20) along the defined axis;
   an active control mechanism responsive to the output of the at least one sensor,
   comprising a movable first mass (70) and driven by a coil (56) which when activated creates a force on the steering wheel (20) which induces an acceleration of the steering wheel (20) as sensed by a second sensor (92) and including a third sensor (140, 142, 144 or 146) capable of identifying a pending emergency and for generating a pending emergency signal and wherein the control mechanism uses the pending emergency signal to activate the coil (56) thereby inducing a vibration in the steering wheel (20) of sufficient magnitude to be sensed by the driver,
   the control mechanism generates a differential velocity signal used to drive the acceleration toward zero and wherein the pending emergency signal includes a) an indication another vehicle is too close, or b) a vehicle is in a traffic lane into which the driver wishes to enter.

2. The system according to claim 1 where the at least one sensor and the second sensor are accelerometers (90, 92) configured to sense acceleration along the defined axis.

3. The system according to claim 1 wherein the control mechanism calculates a velocity signal based upon the output of each of the at least one sensors and creates a differential velocity signal to drive the coil (56) and mass (70) to decrease the steering wheel vibrations toward zero.

4. The system of claim 1 wherein the steering wheel (20) comprises a metal armature (22) which includes a rim (24) and a number of spokes (26), a central hub plate (28) and/or hub (29) adapted to be secured to a steering column (12).

5. The system of claim 4 wherein the rim (24) and spokes (26) are covered by a leather or plastic covering.

6. The system of claim 5 wherein the steering wheel (20) includes a driver airbag module (40) having a housing (42) secured to the armature (22), the driver airbag module (40)

includes an airbag (44) and an inflator (45), covered by a cover (46) connected to the housing (42) and secured to the armature (22).

7. The system of claim 6 wherein the active control mechanism is a linear motor or vibrator (50) which is part of the system (300), the motor or vibrator (50) includes a housing or bracket (52) connectable to the armature (22) of the steering wheel (20) or alternatively secured to the module housing which in turn is secured to the armature (22).

8. The system of claim 7 wherein the linear motor (50) includes a core (54) which also defines an axis (55) about which the coil (56) is wound.

9. The system of claim 8 wherein the movable first mass (70) is made of iron or other magnetizable material and is positioned adjacent the coil (56).

10. The system of claim 9 wherein the coil (56) is wound such that when excited it will produce an electromagnetic field producing alternating forces in the direction along or parallel to the axis (55).

11. The system of claim 10 wherein in response to the magnetic field the movable mass (70) will alternately be linearly displaced in a direction responsive to the magnetic field.

12. The system of claim 7 wherein the linear motor (50) has springs (78) mounted between the mass (70) and the housing and when the coil (56) is excited and the mass (70) moves a reactive force F is transmitted through the housing (52) to the armature (22) causing vibrations.

13. The system of claim 12 wherein the linear motor (50) includes the at least one sensor (90) responsive to acceleration along the axis (55).

14. The system of claim 13 wherein the linear motor (50) includes a circuit board (80).

15. The system of claim 4 wherein the system has a second sensor (92) secured to one of the spokes (26) of the armature (22).

16. A system for controlling vibratory motion in a vehicle steering wheel (20) prone to oscillate in a given direction due to extraneous inputs at one or more frequencies, the system comprising:
   a steering wheel (20) of the type exhibiting a vibratory motion along a defined axis at one or more frequencies;
   at least one sensor (90) for sensing the acceleration of the steering wheel (20) along the defined axis;
   an active control mechanism responsive to the output of the at least one sensor (90) comprising a movable first mass (70) and a solenoid coil (56) which when activated moves the mass (70) in a direction opposite to the motion of the steering wheel (20) and at the frequency of motion of the steering wheel, wherein the at least one sensor (90) is secured to the movable first mass (70); and
   wherein the system further comprises a second sensor (92).

17. A system for controlling vibratory motion in a vehicle steering wheel (20) prone to oscillate in a given direction due to extraneous inputs at one or more frequencies, the system comprising:
   a steering wheel (20) of the type exhibiting a vibratory motion along a defined axis at one or more frequencies;
   at least one sensor for sensing the acceleration of the steering wheel (20) along the defined axis;
   an active control mechanism responsive to the output of the at least one sensor comprising a movable first mass (70) and a solenoid coil (56) which when activated moves the mass (70) in a direction opposite to the motion of the steering wheel (20) and at the frequency of motion of the steering wheel; and
   wherein the system further comprises a sensor capable of identifying a vehicle in an adjacent lane and for energizing the solenoid coil causing the steering wheel (20) to vibrate to notify the driver of the vehicle of an impending emergency.

\* \* \* \* \*